United States Patent
Omichi et al.

(10) Patent No.: US 9,283,513 B2
(45) Date of Patent: Mar. 15, 2016

(54) FUEL VAPOR TREATMENT DEVICE

(71) Applicant: MAHLE FILTER SYSTEMS JAPAN CORPORATION, Tokyo (JP)

(72) Inventors: Junpei Omichi, Kawagoe (JP); Hiroyuki Yoshida, Saitama (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 127 days.

(21) Appl. No.: 14/104,529

(22) Filed: Dec. 12, 2013

(65) Prior Publication Data

US 2014/0165843 A1 Jun. 19, 2014

(30) Foreign Application Priority Data

Dec. 18, 2012 (JP) .................. 2012-275245

(51) Int. Cl.
*F02M 25/08* (2006.01)
*B01D 53/04* (2006.01)

(52) U.S. Cl.
CPC ........ *B01D 53/0446* (2013.01); *B01D 53/0415* (2013.01); *F02M 25/08* (2013.01); *B01D 2253/102* (2013.01); *B01D 2257/702* (2013.01); *B01D 2259/4516* (2013.01)

(58) Field of Classification Search
CPC ............... B01D 53/04; B01D 53/0415; B01D 53/0446; B01D 2253/102; B01D 2257/702; B01D 2259/4516; F02M 25/08

USPC .................. 96/121, 139, 144, 147, 152, 154; 95/146; 123/519

See application file for complete search history.

(56) References Cited

U.S. PATENT DOCUMENTS

| | | | | |
|---|---|---|---|---|
| 5,861,050 A | * | 1/1999 | Pittel et al. | 95/115 |
| 7,294,179 B2 | * | 11/2007 | Kim et al. | 96/121 |
| 7,322,343 B2 | | 1/2008 | Yamada et al. | |
| 7,922,797 B2 | * | 4/2011 | Kosugi et al. | 96/147 |
| 2003/0024397 A1 | * | 2/2003 | Meiller et al. | 96/139 |
| 2005/0139068 A1 | | 6/2005 | Kim et al. | |
| 2008/0302340 A1 | * | 12/2008 | Defilippi | 123/519 |
| 2010/0147152 A1 | * | 6/2010 | Kosugi | 96/146 |

FOREIGN PATENT DOCUMENTS

| | | |
|---|---|---|
| CN | 1637266 A | 7/2005 |
| JP | 2007-146793 A | 6/2007 |

OTHER PUBLICATIONS

Chinese Office Action, Sep. 25, 2015, 13 pages.

* cited by examiner

*Primary Examiner* — Frank Lawrence
(74) *Attorney, Agent, or Firm* — Foley & Lardner LLP

(57) ABSTRACT

A fuel vapor treatment device including a casing including a gas passage formed in the casing, a granular adsorbent filled in the gas passage, the granular adsorbent serving to adsorb and desorb fuel vapor, and a desorption promoting structure to promote desorption of the fuel vapor in a central portion of a cross-sectional area of the gas passage as compared to an outer peripheral portion of the cross-sectional area of the gas passage.

4 Claims, 4 Drawing Sheets

FUEL VAPOR TREATMENT DEVICE

BACKGROUND OF THE INVENTION

The present invention relates to a fuel vapor treatment device that is used for adsorbing and desorbing fuel vapor generated, for instance, in a fuel tank of a vehicle.

Japanese Patent Application Unexamined Publication No. 2007-146793 A discloses a canister as a fuel vapor treatment device which is used in a gasoline-fueled vehicle in order to suppress emission of fuel vapor generated within a fuel tank to atmospheric air. As well known, the canister includes a casing, a gas passage formed in the casing, and an adsorbent such as granular activated carbon which is filled in the gas passage and serves for adsorbing and desorbing fuel vapor.

SUMMARY OF THE INVENTION

In recent years, environmental protection regulations have become more strict. Further, an amount of air during purge (desorption) by purge gas is reduced due to hybridization of a vehicle, and therefore, it is required to suppress bleed emission (hereinafter referred to simply as "bleed") of fuel vapor during purge by purge gas containing the reduced amount of air. In order to suppress the bleed, it is effective to enhance an efficiency of desorbing fuel vapor (hereinafter referred to simply as "desorption efficiency") during the purge.

Regarding the desorption efficiency, main factors considerably lowering the desorption efficiency are a temperature drop of the granular adsorbent during the purging and non-uniformization of flow of purge gas over a cross-sectional area of the gas passage in the canister. Accordingly, in order to enhance the desorption efficiency, it is effective to solve or improve the main factors.

From the theoretical and mechanical viewpoint, in a case where fluid flows in a passage, the fluid is more difficult to flow through an outer peripheral portion of the cross-sectional area of the gas passage which is located close to a wall surface defining the gas passage due to a resistance of the wall surface, as compared to a central portion of the cross-sectional area of the gas passage. However, in a case of a canister filled with a granular activated carbon (adsorbent), granular carbon particles are arranged therein in a three-dimensional manner. As a result, there occurs the following tendency. In the central portion of the cross-sectional area of the gas passage, carbon particles are entered into voids formed between the adjacent two carbon particles so that the voids between the adjacent carbon particles are reduced. In contrast, in the outer peripheral portion of the cross-sectional area of the gas passage, the voids between the wall surface and the carbon particles filled are larger than the voids between the adjacent carbon particles in the central portion of the cross-sectional area of the gas passage. Therefore, friction (pressure loss) in the outer peripheral portion of the cross-sectional area of the gas passage becomes smaller than that in the central portion of the cross-sectional area of the gas passage, so that during purge by purge gas, the purge gas can be promoted to flow through the outer peripheral portion of the cross-sectional area of the gas passage while it is difficult for the purge gas to flow through the central portion of the cross-sectional area of the gas passage.

As a result, a desorption efficiency over the cross-sectional area of the gas passage becomes non-uniform, that is, purge is difficult to promote in the central portion of the cross-sectional area of the gas passage, and fuel vapor is likely to locally remain in the central portion of the cross-sectional area of the gas passage. Therefore, the canister cannot achieve a desired purging performance corresponding to a capacity of the canister, thereby failing to effectively suppress emission (bleed) of the fuel vapor to atmospheric air.

The present invention has been made in view of the above-described problems. It is an object of the present invention to provide a fuel vapor treatment device capable of suppressing non-uniformization of a desorption efficiency in a cross-sectional area of a gas passage, thereby serving to enhance a desorption performance (purging performance) thereof during purge.

In a first aspect of the present invention, there is provided a fuel vapor treatment device including:

a casing including a gas passage formed in the casing;

a granular adsorbent filled in the gas passage, the granular adsorbent serving to adsorb and desorb fuel vapor; and a desorption promoting structure to promote desorption of the fuel vapor in a central portion of a cross-sectional area of the gas passage as compared to an outer peripheral portion of the cross-sectional area of the gas passage.

The fuel vapor treatment device according to the first aspect of the present invention in which desorption of fuel vapor in the central portion of the cross-sectional area of the gas passage is promoted, can be prevented from non-uniformization of the desorption efficiency in the cross-sectional area of the gas passage and can exhibit desired desorption performance corresponding to a capacity of the fuel vapor treatment device, thereby effectively suppressing emission (bleed) of the fuel vapor to atmospheric air.

In a second aspect of the present invention, there is provided the fuel vapor treatment device according to the first aspect of the present invention, wherein the desorption promoting structure includes a first granular adsorbent filled in the central portion of the cross-sectional area of the gas passage and a second granular adsorbent filled in the outer peripheral portion of the cross-sectional area of the gas passage, the first granular adsorbent having a grain size larger than a grain size of the second granular adsorbent. With the thus configured desorption promoting structure, the voids between particles of the first granular adsorbent which are formed in the central portion of the cross-sectional area of the gas passage can be increased to promote a gas flow therethrough to thereby promote desorption of fuel vapor in the central portion of the cross-sectional area of the gas passage.

In a third aspect of the present invention, there is provided the fuel vapor treatment device according to the first aspect of the present invention, wherein the desorption promoting structure includes a first granular adsorbent filled in the central portion of the cross-sectional area of the gas passage and a second granular adsorbent filled in the outer peripheral portion of the cross-sectional area of the gas passage, the first granular adsorbent having self-emission properties higher than self-emission properties of the second granular adsorbent. With the thus configured desorption promoting structure, it is possible to promote desorption of the fuel vapor in the central portion of the cross-sectional area of the gas passage.

In a fourth aspect of the present invention, there is provided the fuel vapor treatment device according to the first aspect of the present invention, wherein the desorption promoting structure includes a grid disposed in the gas passage so as to traverse the gas passage, the grid being formed with a plurality of vent holes to permit gas to flow therethrough, the plurality of vent holes including first vent holes opposed to the central portion of the cross-sectional area of the gas passage and second vent holes opposed to the outer peripheral portion of the cross-sectional area of the gas passage, the first vent holes being larger in size than the second vent holes.

With the thus configured desorption promoting structure, it is possible to promote a gas flow in the central portion of the cross-sectional area of the gas passage to thereby promote desorption of fuel vapor in the central portion of the cross-sectional area of the gas passage.

In the fuel vapor treatment device of the present invention, desorption of fuel vapor in a central portion of a cross-sectional area of a gas passage is promoted, so that non-uniformization of desorption efficiency in the cross-sectional area of the gas passage can be suppressed, that is, a difference in desorption efficiency between the central portion of the cross-sectional area of the gas passage and an outer peripheral portion of the cross-sectional area thereof can be eliminated. As a result, the desorption efficiency can be enhanced, and therefore, emission of the fuel vapor to atmospheric air can be suppressed.

DETAILED DESCRIPTION OF EMBODIMENTS

Figure 1:
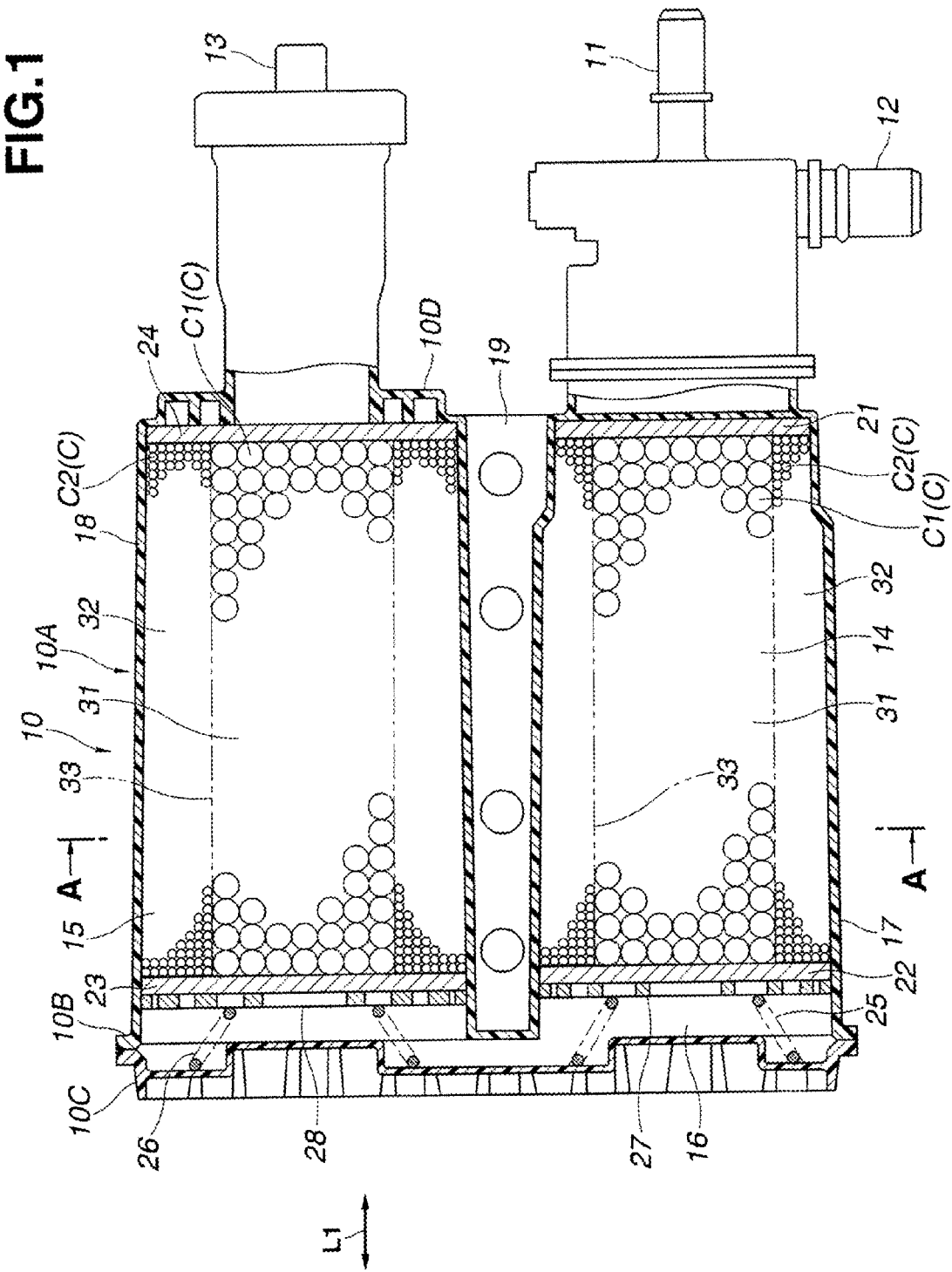
FIG. 1 is a sectional view of a canister as a fuel vapor treatment device according to a first embodiment of the present invention.
Figure 2:
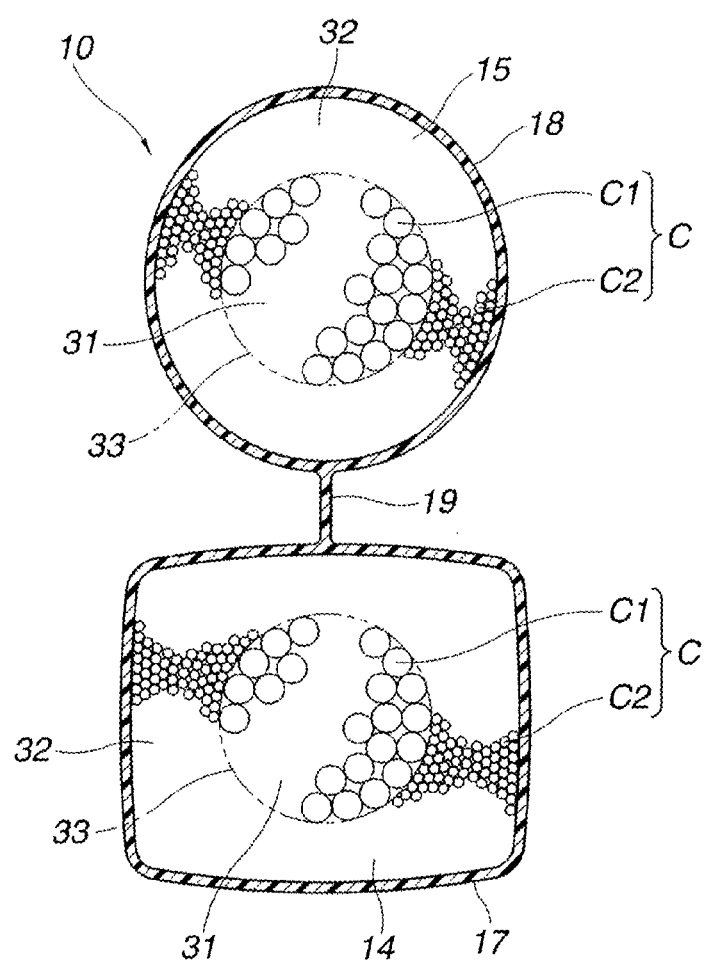
FIG. 2 is a sectional view taken along line A-A shown in FIG. 1.

A fuel vapor treatment device (hereinafter referred to simply as a canister) according to a first embodiment of the present invention will be explained hereinafter by referring to accompanying drawings. FIG. 1 is a sectional view of a so-called dual chamber canister. FIG. 2 is a sectional view of the canister according to the first embodiment of the present invention, taken along line A-A shown in FIG. 1.

The canister includes a casing 10 made of a synthetic resin material that is available with lightweight and low costs. As shown in FIG. 1, the casing 10 includes a generally box-shaped casing body 10A having one open end and a plate-shaped cover 100 connected to the one open end of the casing body 10A to form a bottom of the casing 10. Specifically, the casing body 10A has an opening 10B at one end thereof in a longitudinal direction L1 thereof (in a left-right direction as viewed in FIG. 1). The cover 100 is fixed to the opening 10B so as to close the opening 10B. The casing body 10A also has a port wall 10D on the other end thereof which defines a purge port 11, a charge port 12 and a drain port 13. The purge port 11 is connected to an air intake portion of a vehicle engine through a pipe (not shown). The charge port 12 is connected to a fuel tank through a pipe (not shown). The drain port 13 is communicated with atmospheric air (outside air).

Further, the casing body 10A includes a first cylindrical portion 17 that defines a first gas passage 14, a second cylindrical portion 18 that defines a second gas passage 15, and a thin plate-shaped partition wall 19 through which the first cylindrical portion 17 and the second cylindrical portion 18 are connected to form the integral casing body 10A. The first cylindrical portion 17 and the second cylindrical portion 18 are disposed parallel with each other. As shown in FIG. 2, the first cylindrical portion 17 has a generally rectangular section, and the second cylindrical portion 18 has a generally circular section. The first gas passage 14 and the second gas passage 15 extend along the longitudinal direction L1 of the casing body 10A. The first gas passage 14 is connected to the purge port 11 and the charge port 12 at one end thereof. The second gas passage 15 is connected to the drain port 13 at one end thereof. The first gas passage 14 and the second gas passage 15 are connected with each other at the other ends thereof through a U-turn gas passage 16 defined between the one open end of the casing body 10A and the cover 100. Thus, in the casing 10, the first gas passage 14, the second gas passage 15 and the U-turn gas passage 16 are connected in series to each other, and cooperate with each other to form a generally U-shaped long gas path in the compact casing 10.

The first gas passage 14 and the second gas passage 15 are filled with granular activated carbon C (C1, C2) as an adsorbent, respectively. The granular activated carbon C1 is filled in a central portion of each of the gas passages 14, 15 as viewed in a cross section of each of the gas passages 14, 15. The granular activated carbon C2 is filled in an outer peripheral portion of each of the gas passages 14, 15 as viewed in a cross section of the gas passages 14, 15. Gas permeable screens (filters) 21, 22 made of a nonwoven fabric are disposed at both ends of the first gas passage 14. Similarly, gas permeable screens (filters) 23, 24 made of a nonwoven fabric are disposed at both ends of the second gas passage 15. That is, the activated carbon C filled in the first gas passage 14 is supported without leakage in a sandwiched state between the gas permeable screens 21, 22, and the activated carbon C filled in the second gas passage 15 is supported without leakage in a sandwiched state between the gas permeable screens 23, 24. Further, on a side of the U-turn passage 16, return springs 25, 26 and grids 27, 28 are disposed between the cover 10C and the screens 22, 23, respectively. The grid 27 is a plate-shaped member and disposed so as to traverse the first gas passage 14. Similarly, the grid 18 is a plate-shaped member and disposed so as to traverse a cross-sectional area of the second gas passage 15. The grids 27, 28 each have a plurality of through holes 30 serving as vent holes to permit gas to flow therethrough. The return spring 25 is disposed in a compressed state between the cover 10C and the grid 27. The return spring 26 is disposed in a compressed state between the cover 10C and the grid 28. With the provision of the return springs 25, 26, a predetermined tension is given to the activated carbon C filled in each of the gas passages 14, 15 so that the activated carbon C can be stably retained without being flattened even when the activated carbon C is worn due to the use in a long duration.

Upon fabricating the canister, the casing body 10A is placed in a reversed upside-down state in which the opening 10b is upwardly oriented, and the screens 21-24, the activated carbons C, the grids 27, 28 and the return springs 25, 26 are inserted into the casing body 10A in this order and assembled thereto. Finally, the cover 100 is connected to the open end of the casing body 10A.

A basic operation of the canister is now explained. Upon the adsorption stage, a gas containing fuel vapor is introduced into the canister through the charge port 12. While the gas sequentially flows through the first gas passage 14, the U-turn passage 16 and the second gas passage 15, the fuel vapor is adsorbed in the activated carbon C in the first gas passage 14 and the second gas passage 15, and the remaining clean gas is emitted to atmospheric air through the drain port 13. On the other hand, upon the desorption (purging) stage, atmospheric gas is introduced into the canister through the drain port 13. While the atmospheric gas sequentially flows through the second gas passage 15, the U-turn passage 16 and the first gas passage 14, the fuel vapor adsorbed in the activated carbon C is desorbed from the activated carbon C. The fuel vapor desorbed is supplied to an air intake portion of the engine through the purge port 11 and then subjected to combustion treatment within a combustion chamber of the engine.

Next, an essential construction of the canister according to the first embodiment of the present invention will be explained. In the canister in which the granular activated carbon C is filled in the gas passages 14, 15, there is a tendency that in the vicinity of inner wall surfaces of the cylindrical portions 17, 18 which define the gas passages 14, 15, voids are generated between the granular activated carbon C and the inner wall surfaces of the cylindrical portions 17, 18. Therefore, the gas is difficult to flow in a central portion 31 of the cross-sectional area of each of the gas passages 14, 15 in the longitudinal direction L1 thereof, as compared to an outer peripheral portion 32 of the cross-sectional area of each of the gas passages 14, 15 which is located close to the inner wall surface of each of the cylinders 17, 18. As a result, there tends to occur such a problem that due to the non-uniformization of the gas flowing through the gas passages 14, 15, a desorption efficiency in the central portion 31 is reduced as compared to that in the outer peripheral portion 32 to thereby fail to attain a uniform desorption performance corresponding to a capacity of the canister. In order to solve the problem, in the canister according to the first embodiment of the present invention, there is provided a desorption promoting structure to promote desorption of the adsorbed fuel vapor in the central portion 31 of the cross-sectional area of each of the gas passages 14, 15 as compared to the outer peripheral portion 32 of the cross-sectional area thereof. With the desorption promoting structure, it is possible to suppress non-uniformization of the gas flow over the cross-sectional area of each of the gas passages 14, 15 and the desorption efficiency, and ensure a desired uniform desorption performance corresponding to a capacity of the canister. As a result, the fuel vapor can be effectively prevented from being emitted to atmospheric air.

The desorption promoting structure of the canister according to the first embodiment of the present invention is now explained. As shown in FIG. 1 and FIG. 2, the desorption promoting structure includes the first granular activated carbon (the first adsorbent) C1 filled in the central portion 31 of the cross-sectional area of each of the gas passages 14, 15 and the second granular activated carbon (the second adsorbent) C2 filled in the outer peripheral portion 32 of the cross-sectional area of each of the gas passages 14, 15, in which the first granular activated carbon C1 has a grain size (an average grain size) larger than that of the second granular activated carbon C2 filled in the outer peripheral portion 32 of the cross-sectional area of each of the gas passages 14, 15 such that a void ratio in the central portion 31 becomes higher than that in the outer peripheral portion 32. In other words, the desorption promoting structure includes the granular activated carbon C1 filled in the central portion 31 of the cross-sectional area of each of the gas passages 14, 15 and the granular activated carbon C2 filled in the outer peripheral portion 32 of the cross-sectional area thereof which are different from each other in grain size such that a gas flow is promoted in the central portion 31 of the cross-sectional area of each of the gas passages 14, 15 as compared to the outer peripheral portion 32 of the cross-sectional area thereof to thereby equalize the desorption efficiency thereof.

The granular activated carbons can be filled in the gas passages 14, 15 in the following manner. For instance, when the first granular activated carbon C1 and the second granular activated carbon C2 are filled in the gas passages 14, 15, a cylindrical collar member is set at a boundary 33 between the central portion 31 and the outer peripheral portion 32 of the cross-sectional area of each of the gas passages 14, 15. After the filling operation is completed, the collar member is removed.

Figure 3:
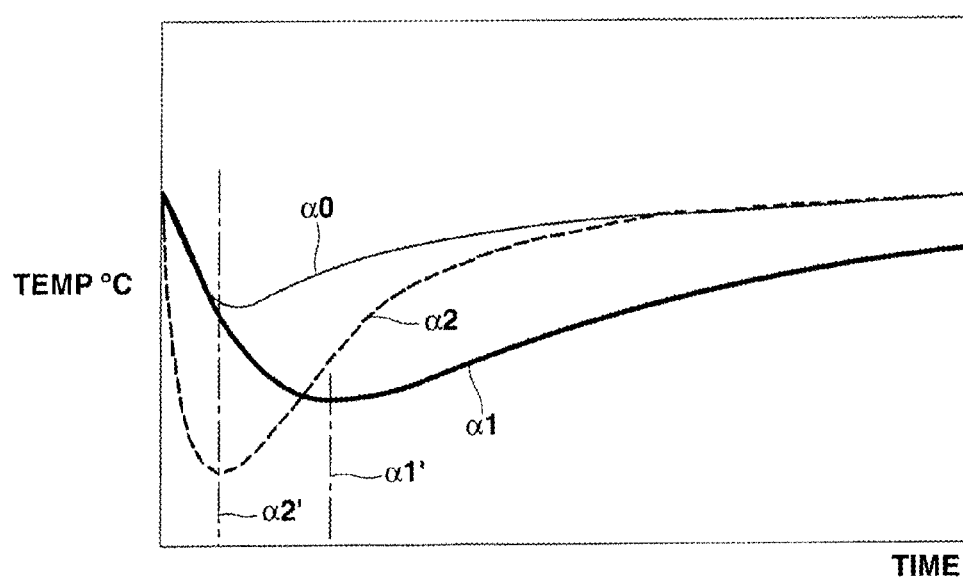
FIG. 3 is a graph showing temperature changes in activated carbon during purge as observed in the canister according to the first embodiment of the present invention and a canister according to a comparative embodiment.

FIG. 3 shows temperature changes in activated carbon during purge as observed in the canister according to the first embodiment of the present invention and a canister according to a comparative embodiment, respectively. In the comparative embodiment, granular activated carbon uniformly filled in the central portion 31 of the cross-sectional area of each of the gas passages 14, 15 has a same grain size as that of granular activated carbon uniformly filled in the outer peripheral portion 32 of the cross-sectional area thereof. In FIG. 3, a characteristic curve $\alpha 0$ indicates a temperature characteristic in the outer peripheral portion 32 of the cross-sectional area of each of the gas passages 14, 15 which is located close to the wall surface defining each of the gas passages 14, 15. A characteristic curve $\alpha 1$ indicates a temperature characteristic in the central portion 31 of the cross-sectional area of each of the gas passages 14, 15 in the comparative embodiment. A characteristic curve $\alpha 2$ indicates a temperature characteristic in the central portion 31 of the cross-sectional area of each of the gas passages 14, 15 in the first embodiment.

As shown in FIG. 3, in the comparative embodiment, an inflection point $\alpha 1'$ on the temperature characteristic curve $\alpha 1$ in the central portion 31 of the cross-sectional area which indicates a purge completion time is considerably retarded with respect to that on the temperature characteristic curve $\alpha 0$ in the outer peripheral portion 32 of the cross-sectional area. That is, in the comparative embodiment, the purge in the central portion 31 of the cross-sectional area is not promoted. In a case where such a non-uniform state that the purge is not completed only in the central portion 31 of the cross-sectional area is continued, fuel vapor tends to remain only in the central portion 31 without being desorbed so that bleed (emission) of the fuel vapor into atmospheric air cannot be sufficiently suppressed. In contrast, in the first embodiment of the present invention, a purge completion time at an inflection point $\alpha 2'$ on the temperature characteristic curve $\alpha 2$ in the central portion 31 of the cross-sectional area is substantially the same as that on the temperature characteristic curve $\alpha 0$ in the outer peripheral portion 32 of the cross-sectional area. That is, in the first embodiment of the present invention, the grain size of the granular activated carbon in the central portion 31 of the cross-sectional area is larger than the grain size of the granular activated carbon in the outer peripheral portion 32 of the cross-sectional area in which voids between the adjacent carbon particles are more likely to be formed. As a result, a gas flow in the cross-sectional area of each of the gas passages 14, 15 can be uniformized, and the purge completion time in the central portion 31 of the cross-sectional area and the purge completion time in the outer peripheral portion 32 of the cross-sectional area can be substantially equal to each other. Accordingly, in the first embodiment of the present invention, a desorption performance corresponding to a capacity of the canister can be attained, and bleed (emission) of fuel vapor to atmospheric air can be sufficiently suppressed.

Figure 4:
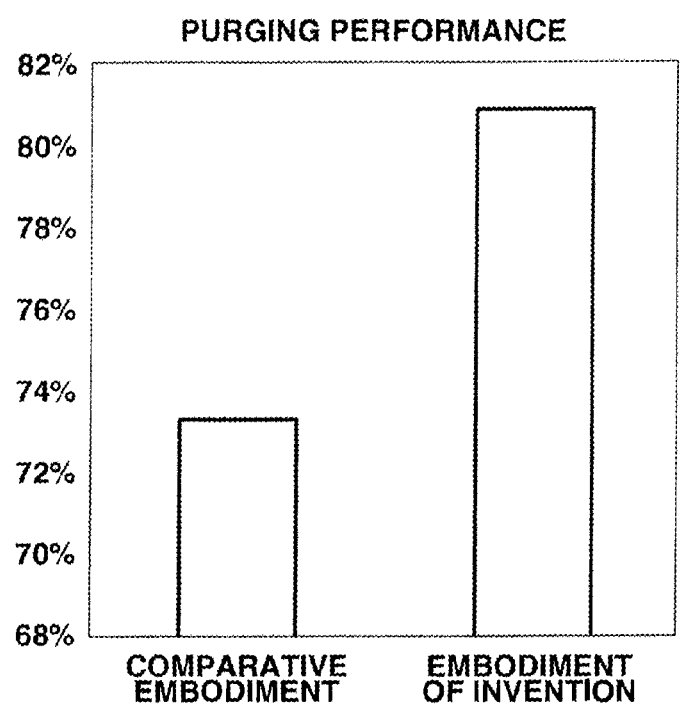
FIG. 4 is a graph showing purging performance of the canister according to the first embodiment of the present invention and purging performance of the canister according to the comparative embodiment.

FIG. 4 shows a purging performance (a ratio of a purge (desorption) amount of fuel vapor desorbed from the activated carbon relative to a total adsorption amount of fuel vapor adsorbed in the activated carbon under a condition that a predetermined amount of air is flowed through the canister) of the canister according to the first embodiment of the present invention and a purging performance of the canister according to the comparative embodiment in which granular activated carbon uniformly filled in the central portion 31 of the cross-sectional area of each of the gas passages 14, 15 has the same grain size as that of granular activated carbon uniformly filled in the outer peripheral portion 32 of the cross-sectional area thereof. As shown in FIG. 4, it was found that in the first embodiment of the present invention, the purging performance is enhanced by approximately 10% as compared to the comparative embodiment.

Figure 5:
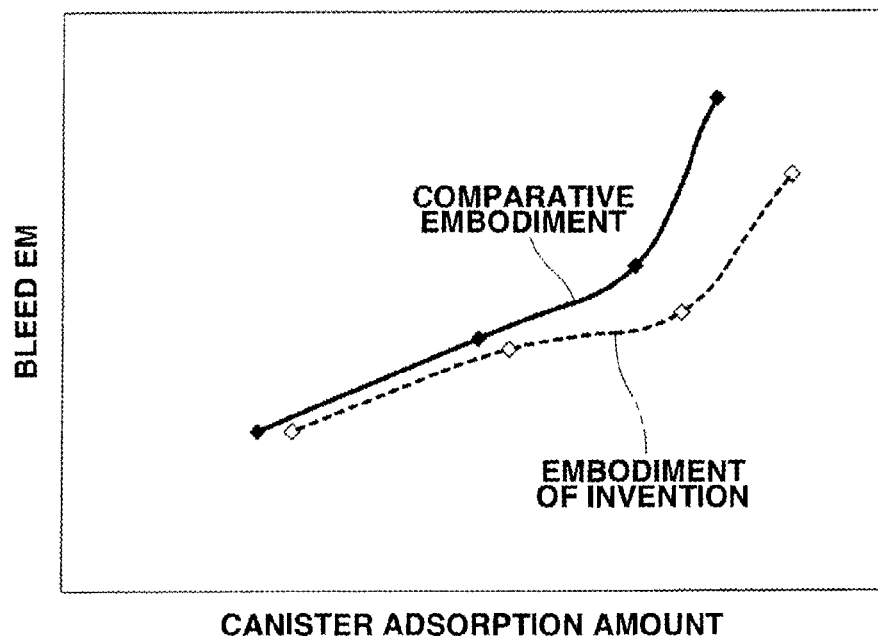
FIG. 5 is a characteristic diagram showing bleeding characteristics with respect to a fuel vapor adsorption amount as observed in the canister according to the first embodiment of the present invention and the canister according to the comparative embodiment.

FIG. 5 shows bleeding (bleed emission) characteristics with respect to an adsorption amount of fuel vapor as observed in the canister according to the first embodiment of the present invention and the canister according to the comparative embodiment. As shown in FIG. 5, it was found that in the first embodiment of the present invention, a fuel vapor bleeding amount (an amount of fuel vapor emitted to atmospheric air) can be reduced to thereby sufficiently restrain fuel vapor from leaking from the canister.

Figure 6:
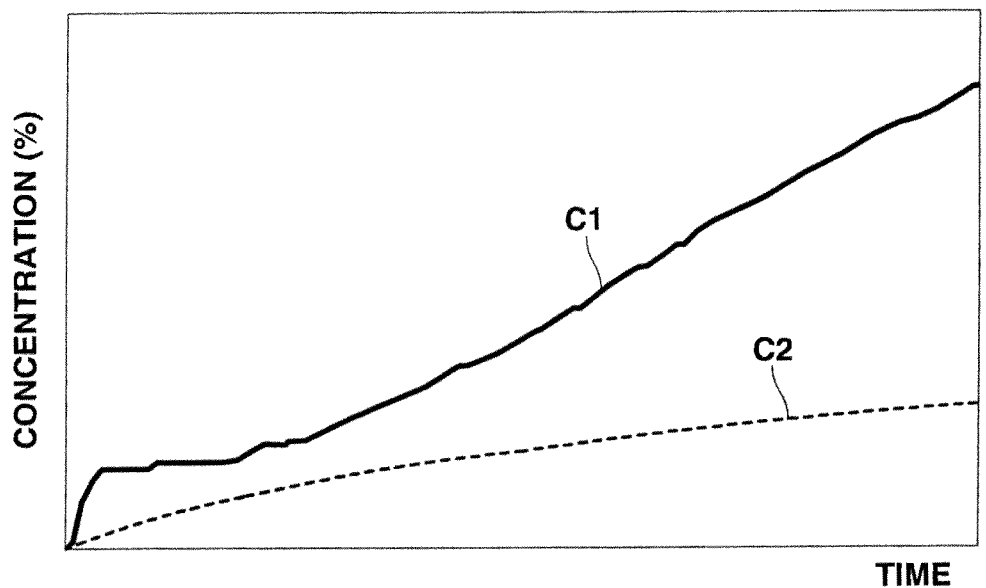
FIG. 6 is a graph showing self-emission properties of activated carbons respectively disposed in a central portion of a cross-sectional area of a gas passage and an outer peripheral portion of the cross-sectional area thereof in a canister according to a second embodiment of the present invention.

Next, referring to FIG. 6, a canister according to a second embodiment of the present invention will be explained hereinafter. In the canister according to the second embodiment, the desorption promoting structure is constituted of the granular activated carbon (the first adsorbent) C1 filled in the central portion 31 of the cross-sectional area of each of the gas passages 14, 15 and the granular activated carbon (the second adsorbent) C2 filled in the outer peripheral portion 32 of the cross-sectional area thereof, the granular activated carbon C1 having self-emission properties higher than self-emission properties of the granular activated carbon C2. FIG. 6 shows the self-emission properties of the granular activated carbon C1 and those of the granular activated carbon C2, each being indicated in terms of a concentration (%) of gas (fuel vapor) emitted from each of the granular activated carbons C1, C2. As seen from FIG. 6, the self-emission properties of the granular activated carbon C1 is higher than those of the granular activated carbon C2. With the thus configured desorption promoting structure, desorption of the adsorbed fuel vapor in the central portion 31 of the cross-sectional area of each of the gas passages 14, 15 can be promoted.

Figure 7:
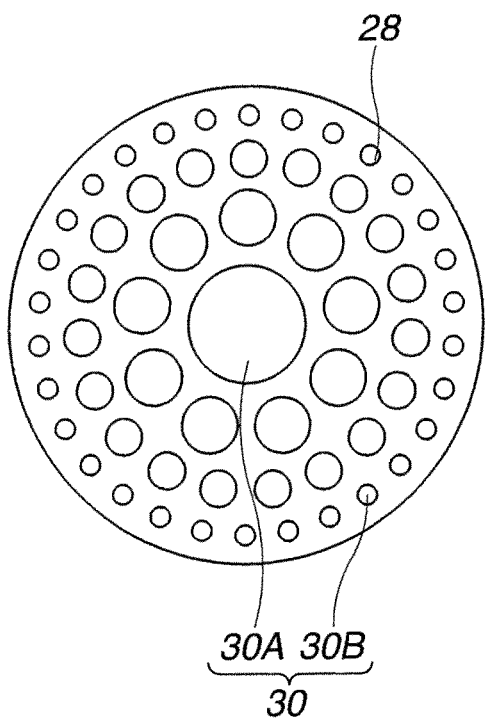
FIG. 7 is a plan view of a grid used in a canister according to a third embodiment of the present invention.

Referring to FIG. 7, a canister according to a third embodiment of the present invention will be explained hereinafter. In the canister according to the third embodiment, the desorption promoting structure is constituted of each of the grids 27, 28 disposed at one ends of the corresponding gas passages 14, 15. FIG. 7 shows only the grid 28 per se disposed at the one end of the second gas passage 15. However, the grid 27 disposed at the one end of the first gas passage 14 has the same configuration as that of the grid 28, and therefore, detailed explanations therefor are omitted. As shown in FIG. 7, the grid 28 having a circular shape in plan view has a plurality of vent holes 30 piercing the grid 28. The plurality of vent holes 30 include vent holes 30A formed in a central portion of the grid 28 in a radial direction of the grid 28 and vent holes 30B formed in an outer peripheral portion of the grid 28 in the radial direction thereof. The vent holes 30A are disposed to be opposed to the central portion 31 of the cross-sectional area of the gas passage 15, and the vent holes 30B are disposed to be opposed to the outer peripheral portion 32 of the cross-sectional area thereof. The vent holes 30A are larger in size than the vent holes 30B. More specifically, the plurality of vent holes 30 are formed such that a size of each of the vent holes 30 is gradually increased as a position thereof is closer to the central portion of the grid 28, and the size of each of the vent holes 30 is gradually reduced as the position thereof is closer to the outer peripheral portion of the grid 28. That is, the plurality of vent holes 30 are formed such that the size of each of the vent holes 30 is gradually increased in the radial direction of the grid 28 from the outer peripheral portion of the grid 28 toward the central portion thereof (i.e., along a direction from the outer peripheral portion 32 of the cross-sectional area of the gas passage 15 toward the central portion 31 of the cross-sectional area thereof). In other words, sizes and layout (degree of density) of the plurality of vent holes 30 are set such that the void ratio in the central portion 31 of the cross-sectional area of the gas passage 15 becomes higher than that in the outer peripheral portion 32 of the cross-sectional area thereof. Thus, by setting the total area of the vent holes 30A opposed to the central portion 31 of the cross-sectional area of the gas passage 15 so as to be larger than that of the vent holes 30B opposed to the outer peripheral portion 32 of the cross-sectional area, a gas flow in the central portion 31 of the cross-sectional area can be facilitated to thereby promote desorption of the adsorbed fuel vapor in the central portion 31 of the cross-sectional area, similarly to the above first embodiment.

The present invention is not particularly limited to the above embodiments. The desorption promoting structures of the canisters according to the above embodiments may be used solely or may be used in combination thereof.

Further, in the desorption promoting structures of the canisters according to the first and second embodiments of the present invention, the grain size or the self-emission properties of the granular activated carbon C are changed between two different ranges divided at the boundary 33, namely between the central portion 31 and the outer peripheral portion 32 of the cross-sectional area of each of the gas passages 14, 15. However, the grain size of the granular activated carbon C or the self-emission properties thereof may be set to be stepwise or gradually increased from the outer peripheral portion 32 of the cross-sectional area toward the central portion 31 thereof.

Furthermore, in the desorption promoting structure of the canister according to the third embodiment of the present invention, the size of each of the vent holes 30 (30A, 30B) of each of the grids 27, 28 is changed between the central portion of each of the grids 27, 28 which are opposed to the central portion 31 of the cross-sectional area of each of the gas passages 14, 15, and the outer peripheral portion of each of the grids 27, 28 which are opposed to the outer peripheral portion 32 of the cross-sectional area thereof. However, the vent holes 30 may be arranged to increase a total size or area of the vent holes 30 opposed to the central portion 31 of the cross-sectional area by increasing the number of the vent holes 30 opposed to the central portion 31 of the cross-sectional area without changing the size of each of the vent holes 30. That is, the vent holes 30 each having a same size may be arranged such that a density of the vent holes 30 opposed to the central portion 31 of the cross-sectional area is increased as compared to that of the vent holes 30 opposed to the outer peripheral portion 32 of the cross-sectional area.

This application is based on a prior Japanese Patent Application No. 2012-275245 filed on Dec. 18, 2012. The entire contents of the Japanese Patent Application No. 2012-275245 are hereby incorporated by reference.

Although the invention has been described above by reference to certain embodiments of the invention and modifications thereof, the invention is not limited to the embodiments and the modifications as described above. Other modifications and variations of the embodiments described above will occur to those skilled in the art in light of the above teachings. The scope of the invention is defined with reference to the following claims.

What is claimed is:

1. A fuel vapor treatment device comprising:
a casing comprising a gas passage formed in the casing;
a granular adsorbent filled in the gas passage, the granular adsorbent serving to adsorb and desorb fuel vapor; and
a desorption promoting structure to promote desorption of the fuel vapor in a central portion of a cross-sectional area of the gas passage as compared to an outer peripheral portion of the cross-sectional area of the gas passage,
wherein the desorption promoting structure comprises a first granular adsorbent filled in the central portion of the cross-sectional area of the gas passage and a second granular adsorbent filled in the outer peripheral portion of the cross-sectional area of the gas passage, the first granular adsorbent having a grain size larger than a grain size of the second granular adsorbent.

2. The fuel vapor treatment device as claimed in claim 1, wherein the first granular adsorbent has self-emission properties higher than self-emission properties of the second granular adsorbent.

3. The fuel vapor treatment device as claimed in claim 1, wherein the desorption promoting structure includes a grid disposed in the gas passage so as to traverse the gas passage, the grid being formed with a plurality of vent holes to permit gas to flow therethrough, the plurality of vent holes including first vent holes opposed to the central portion of the cross-sectional area of the gas passage and second vent holes opposed to the outer peripheral portion of the cross-sectional area of the gas passage, the first vent holes being larger in size than the second vent holes.

4. The fuel vapor treatment device as claimed in claim 3, wherein the size of each of the plurality of vent holes is gradually increased along a direction from the outer peripheral portion of the cross-sectional area of the gas passage toward the central portion of the cross-sectional area of the gas passage.

* * * * *